(12) United States Patent
Fernandez et al.

(10) Patent No.: US 7,804,503 B2
(45) Date of Patent: Sep. 28, 2010

(54) ANIMATING OBJECTS USING METADATA

(75) Inventors: Roland Fernandez, Woodinville, WA (US); Wistar D. Rinearson, Redmond, WA (US); Bradford Gillespie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 886 days.

(21) Appl. No.: 11/433,927

(22) Filed: May 15, 2006

(65) Prior Publication Data

US 2007/0262996 A1 Nov. 15, 2007

(51) Int. Cl.
*G06T 15/70* (2006.01)
(52) U.S. Cl. ........................ 345/475; 345/951
(58) Field of Classification Search ............. 345/951
See application file for complete search history.

(56) References Cited

U.S. PATENT DOCUMENTS

| | | | |
|---|---|---|---|
| 6,215,495 B1 * | 4/2001 | Grantham et al. | 345/419 |
| 6,414,685 B1 * | 7/2002 | Takakura et al. | 345/473 |
| 6,563,503 B1 * | 5/2003 | Comair et al. | 345/473 |
| 2004/0233201 A1 * | 11/2004 | Calkins et al. | 345/473 |
| 2005/0156932 A1 * | 7/2005 | Vienneau et al. | 345/473 |

OTHER PUBLICATIONS

Richard Cooper, Graham N. C. Kirby, "Type-Safe Linguistic Runtime Reflection—A Practical Perspective," Sep. 5, 1994, Proceedings of the Sixth International Workshop on Persistent Object Systems, pp. 332-354.*

* cited by examiner

*Primary Examiner*—Jason M Repko

(57) ABSTRACT

A design application uses metadata-based techniques (e.g., runtime reflection) to examine class metadata of design objects. A key object is provided by a programmer of a graphical design application to generically animate properties of design objects in one or more animation frames. Using runtime reflection or other metadata techniques, the key object finds properties of each design object and updates specified property values for animated display in one or more animation frames. A key set object is provided to group multiple key objects into a sequence of key frames along a timeline. In this manner, a programmer can provide a small amount of support program code (e.g., a key class and a key set class) that can be associated with selected design objects at runtime of the design application in order to allow an animation designer to decide which design objects and which properties to animate.

20 Claims, 8 Drawing Sheets

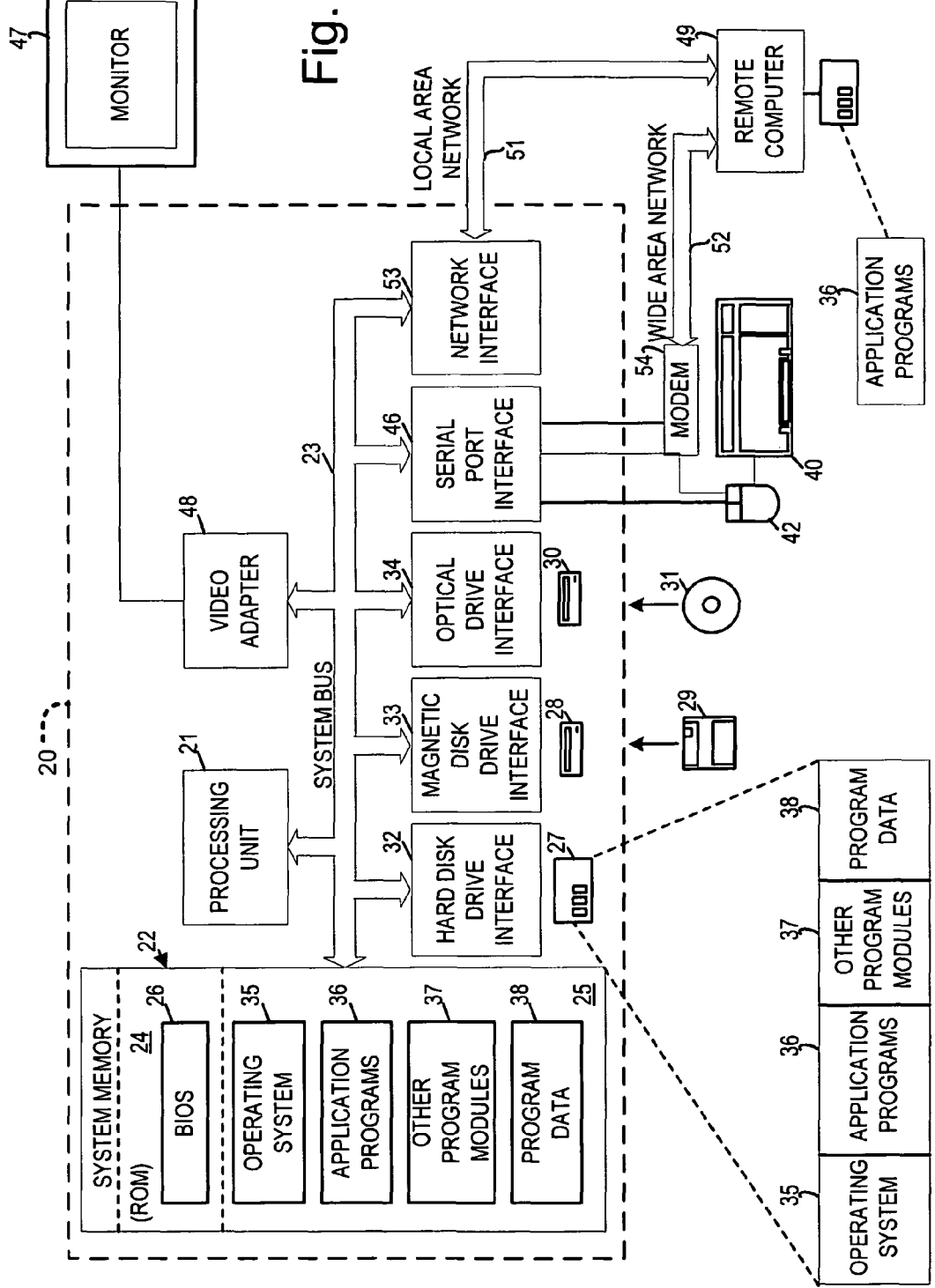

ANIMATING OBJECTS USING METADATA

BACKGROUND

Many application programs can benefit from the ability to animate the objects within them (e.g., to change the value of an object property over time). Such programs may include, for example, applications where the programmer specifies how the objects are animated and applications that allow an animation designer to design and playback animations. Such applications are typically visual in nature (e.g., two dimensional (2D) or three dimensional (3D) design applications, games, business and consumer applications with graphics, etc.), but they can also include non-visual application, such as data-generating simulation applications. Animations for these types of applications are usually specified in "key frames" or on a frame-by-frame basis.

For the application programmer, deciding which classes and which properties should be animatable and then adding the animation support code to class and property can be a challenging task. Extending the animation support to objects from third party add-ins to the application presents even more challenges.

As an example, consider a 3D design application that supports user design and playback of animation. Typically, an animation designer uses a design application, developed by a programmer, to select and place objects in an environment. The designer can then introduce animation effects by setting animatable properties of the objects. For example, the designer can specify a change in a position property of an object over time to cause the object to move across the screen in a graphical animation sequence. Example results generated by the design application may include an animation key frame data file, a computer generate imagery (CGI) video, a computer game graphics files, etc.

In an animation design environment, a designer may be working with a set of hundreds of animatable objects, each with hundreds of properties. Unfortunately, the designer may be limited in the objects and properties that have been enabled by the programmer for animation. That is, rather than exhaustively providing animation code for all classes and properties, the programmer typically chooses to enable animation for a subset of classes and properties he or she believes will be of use to the designer. In other words, the programmer attempts to predict in advance which classes will need to support animation and then writes special animation code for each property that can be animated. Too often, however, the programmer's choices do not align perfectly with the animator's needs. For example, a programmer may have chosen to provide an interface to a rotation property, but not to a transparency property, even though the property exists in the object. Thus, even if the animation designer wishes to animate transparency on the object, he or she may be unable to provide that effect.

It should be understood that limits to the programmer-provided animation options are typically pragmatic. For example, if a design application supports a hundred animation classes, each of which can have over a hundred potentially animated properties, enabling each and every class/property combination to be animated is an exhaustive programming task. Furthermore, exhaustive programming of such properties would be considered overkill, as the animator is likely to animate only a very small subset of these properties and classes. Exhaustive programming would also result in a design application that is more difficult to maintain. The challenge presented then is: for which classes and properties should the programmer provide animation code, so as to provide the animation designer with all of the options needed, without programming all properties for animation? In this light, existing approaches do not address this challenge and merely limit the animator's animation options, or at least require the animator to go back to the programmer and request incorporation of the missing functionality in the design application.

SUMMARY

Implementations described and claimed herein address the foregoing problems by providing the programmer with an animation process that can use runtime reflection or other class/property metadata techniques to automatically enable animation of all compatible properties of all classes within the application. In one implementation, a key class and a key set class are employed to provide a key frame approach to specify the animation, based on compiler-supplied metadata. Using runtime reflection, for example, the key object accesses the specified properties of each design object and updates specified property values for animated display in one or more animation frames. A key set object is provided to group multiple key objects into a sequence of key frames along a timeline. In this manner, a programmer can provide (or import from a library) a small amount of support program code (e.g., a key class and a key set class) that can be associated with selected design objects at runtime of the design application in order to allow an animation designer to decide which design objects and which properties to animate.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 illustrates an example system that may be useful in implementing the described technology.

DETAILED DESCRIPTION

Figure 1:
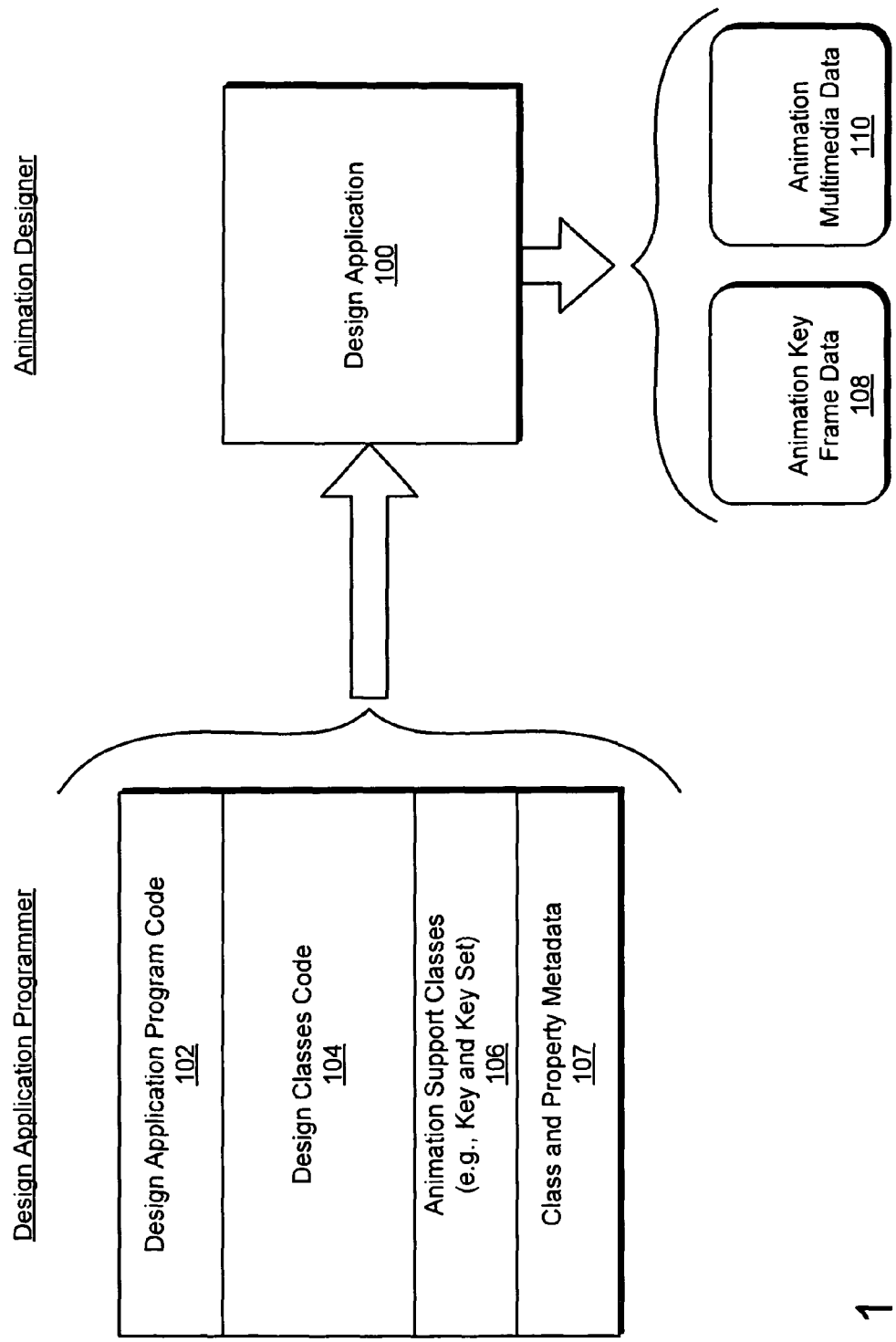
FIG. 1 illustrates an example design application employing metadata to provide animation.

FIG. 1 illustrates an example design application 100 employing runtime reflection or other metadata techniques to provide animation. Instead of providing property-by-property animation enabling code, the programmer includes animation support classes 106 (e.g., key class and key set class code). In this example, the compiler has supplied the class and property metadata 107. Design application program code 102 provides the user interface, file management, and other support features of the design application 100. Design classes code 104 includes classes that define various (or all) objects within the design environment. Example design objects may include, for example, such as a cube, a sphere, a tube, a tea pot (see e.g., FIG. 2), an ogre, a donkey, a human, etc. Each design class typically includes properties, such as location, color, length, transparency, etc., many of which can be modified to provide animation effects.

It should be understood that animation support, such as that described herein, need not be limited to the design classes code 104. Animation can also be automatically enabled for compatible properties in the design application program code 102. In this manner, the animation designer can animate parts of the application beyond the traditional elements of the 3D design environment. For example, a window that includes the 3D design environment may be defined by a class in the design application program code 102. At animation design time, the user may elect to change the size of the window at certain key frames during the animation. Accordingly, key objects could be created to effect these changes to the window object, even though the window class is not included in the design classes code 104. This feature of the described technology provides the animation designer with an even richer set of design classes from which to define objects for animation.

Traditionally in computer animation (with roots in hand drawn animation) key frames provide an alternative to specifying frame-by-frame property values changes. Using start and end property values, corresponding to starting and ending "key" frames, animations systems calculate the "in between" frame-by-frame property values, using various linear and/or nonlinear functions to define how the property changes from its start value over the in-between frames.

The key and key set class code 106 provides support for key frame oriented animation using runtime reflection. A key object, for example, relates to a key frame of a graphical animation sequence of animation frames. The key object for a given key frame holds the property change information for the objects and properties associated with the key frame that are animated in a common way (e.g., the same frame duration and the same interpolation type). Other objects that are animated with different animation characteristics beginning with the same key frame may be included in different key objects. For example, if an ogre object and a donkey object are "walking through the woods" in a graphical animation sequence, a key object associated with the key frame would collect properties of the ogre object, the donkey object, and any other design objects that should be animated together (e.g., using the same animation length and interpolation type). Multiple key objects for this and other key frames are collected together into a key set object, which manages the graphical animation.

In one implementation, the design application program code 102, animation class code 104, and key class and key set class code 106 combine to provide the design application 100, which an animation designer can use to design a graphical animation sequence. The graphical animation sequence is recorded in animation key frame data 108 (e.g., an XML formatted file defining the state of individual design objects in key frames of the graphical animation sequence). The animation key frame data 108 contains key frame data that can be used to reload the animation sequence in a later design session, to load the animation sequence into another design application, or to load the animation within another application (such as an animation player application). Alternatively or in addition, the design application 100 can generate a multimedia file (e.g., a .wmv or .mpg file) of the animation. The rendered multimedia file can be played from within an application (e.g., a media player), can be used as footage of an animated feature (e.g., "Shrek" or JibJab shorts), etc.

Figure 2:
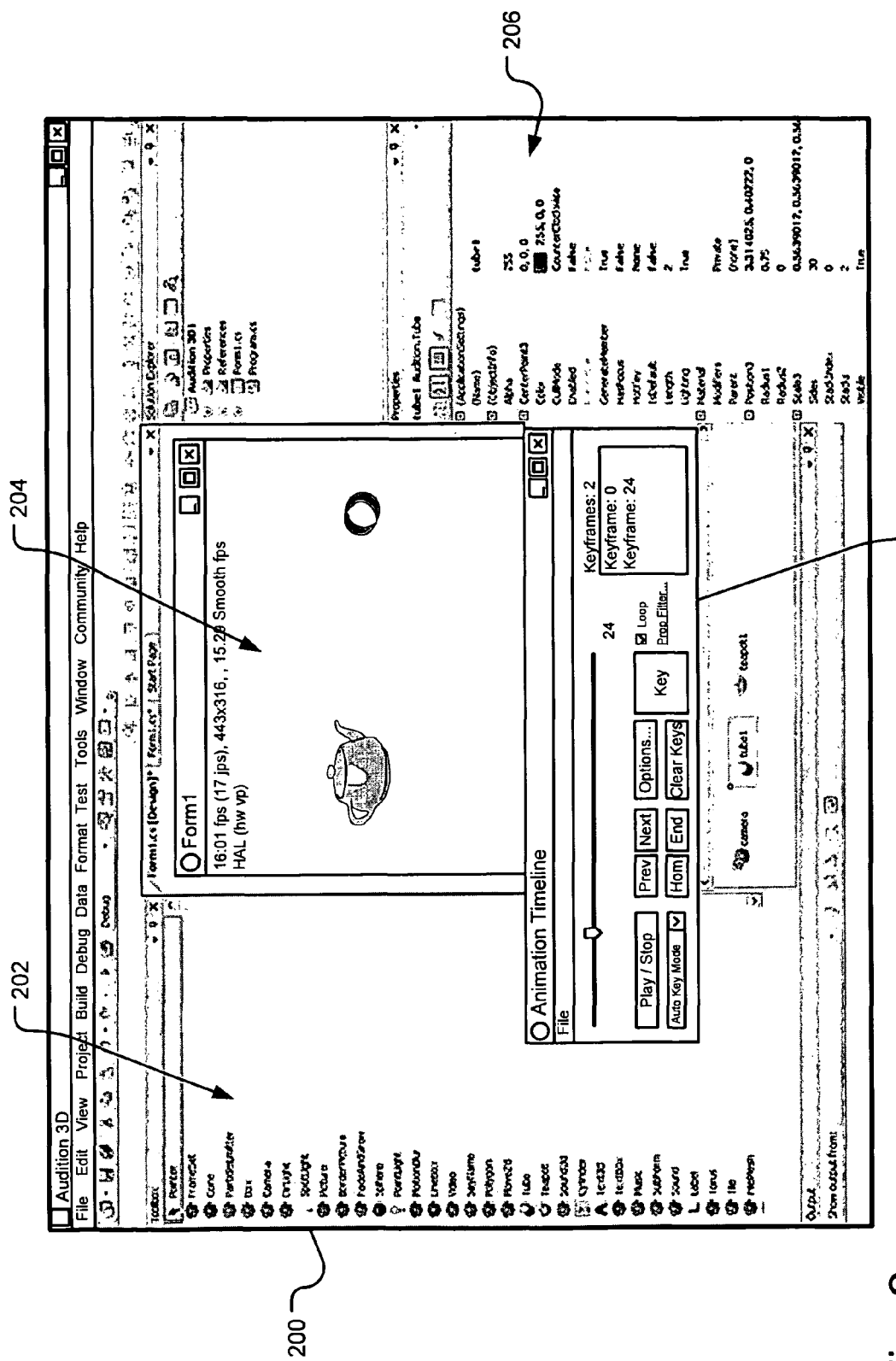
FIG. 2 illustrates an example user interface of a design application employing metadata.

FIG. 2 illustrates an example user interface 200 of a design application employing metadata. A toolbox window 202 displays a list of available design objects from which the designer can choose for including in a graphical animation sequence. A stage window 204 includes selected design objects positioned relative to each other within the 3D environment. As illustrated, a tea pot object and a tube object have been placed in the stage window 204.

Properties and property values of the tube object are listed in a properties window 206. These properties and values may be identified and modified using metadata-based techniques, such as runtime reflection. Runtime reflection is a technique that allows a program to determine arbitrary aspects of an object's type, properties, and property values at runtime, long after the compiler has discarded that information. Using runtime reflection, a program can also find and alter the property values of objects. Some object oriented systems (for example Objective C) use dynamic type binding in the form of an is a pointer that points to a compiler generated object representing the class of that object. Runtime reflection can also referred to as "class description", as one only needs to generate a description of the object's class (e.g. "classes"), then ensure the object is bound to that description. In other object oriented systems, such as C++ or C#, it is not necessary to incur the overhead of an is a pointer, as one can bind an object's type to an overloaded instance of a function call at compile time. Accordingly, using runtime reflection, for example, a design application can identify properties of design objects, as well as query and set their values, without each object providing property-specific program code to make each property accessible and animatable at runtime.

With the design objects placed on the stage, the designer can begin to change properties to the animate objects in a sequence of animation frames using an animation timeline interface 208. Design objects having similarly changing properties (whether visible or hidden) are collected in a key object. Each key object corresponds to a key frame, and each set of key objects are collected in a key set object (see e.g., FIG. 4) to yield a graphical animation sequence of animation frames. Through the animation timeline interface 208, therefore, the designer can define the behavior of the design objects in individual animation frames.

Auto-key mode specifies a mode for automatically creating a key frame associate with the current frame in the timeline whenever the user causes a property value to change. Other property changes in the same frame are added to the key frame. Alternatively, the designer can use a manual mode, in which the designer selects a "create key frame now" button that causes the design application to examine all objects/properties to determine what has changed and then create a key frame at that point. The options button allows the designer to set options related to the timeline (e.g., playback speed, whether playback should loop or stop at the end of the animation, etc.).

In the illustrated timeline interface 208, two key frames are defined (Keyframe 0 and Keyframe 24). By selecting one of the defined key frames, the designer can edit an individual key frame (see e.g., FIG. 3), such as introducing animation effects to the design objects placed on the stage. By selecting "Play/Stop", the designer can see a rendering of the animated objects in the graphical animation sequence in the stage window 204, based on the key frames defined by the interface 208.

Figure 3:
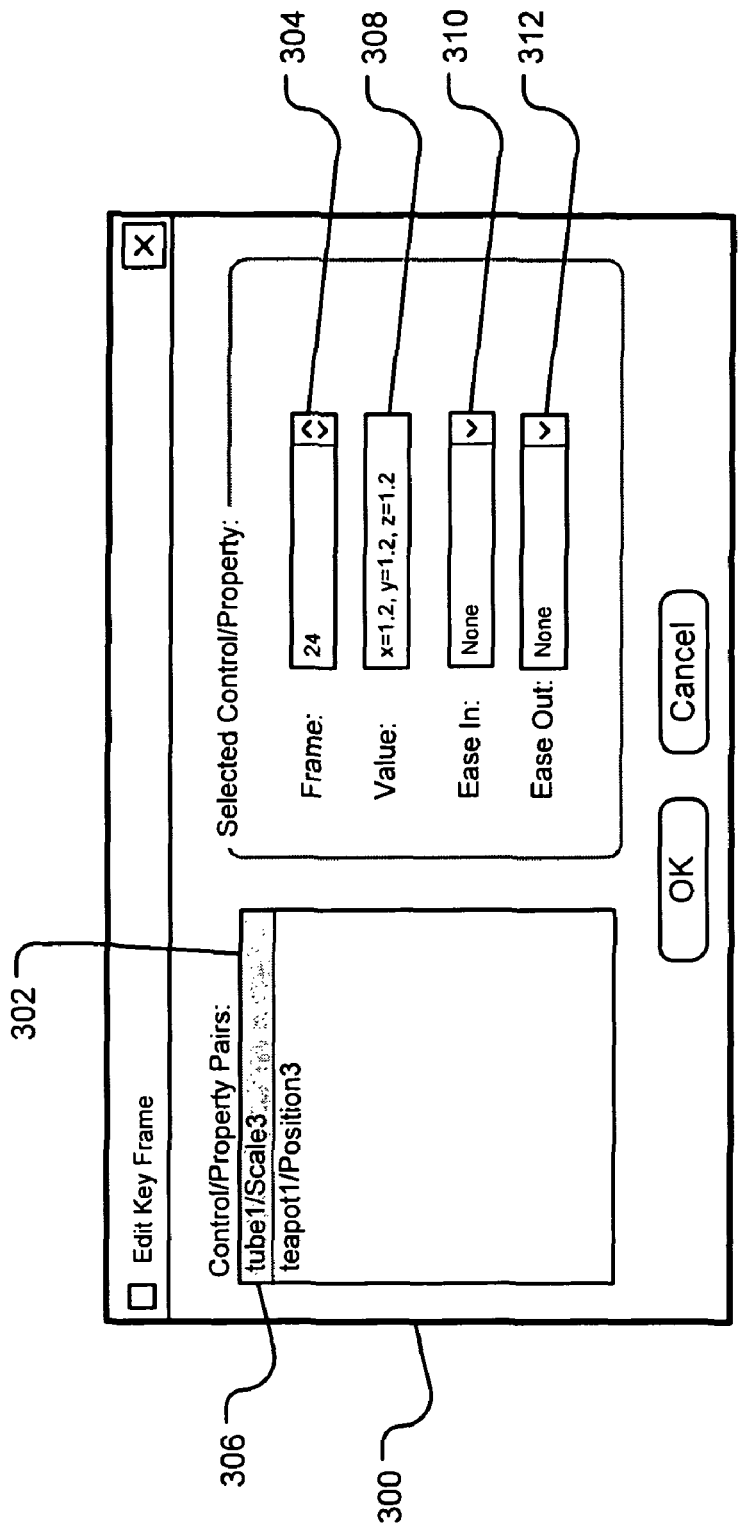
FIG. 3 illustrates an example user interface for editing a key frame based property change of a design object.

FIG. 3 illustrates an example user interface for editing a key frame based property change of a design object stored within a key frame. A Control/Property Pairs list 302 includes the design objects and corresponding properties that have been changed in the current key frame (i.e., key frame 24 in this case, as indicated by Frame field 304). The "tube1/Scale3" property is selected in the user interface 300. The Value field 308 displays the value assigned to the "tube1/Scale3" property (represented as a vector value "x=1.2, y=1.2, z=1.2"). An Ease-In field 310 can be used to define accelerated or decelerated (e.g., non-linear) interpolation at the beginning of the transition from the value at the start of the key frame and the value at the end of the key frame. An Ease-Out field 312 can be used to define accelerated or decelerated interpolation at the end of the transition from the midpoint value of the key frame and the value at the end of the key frame.

Figure 4:
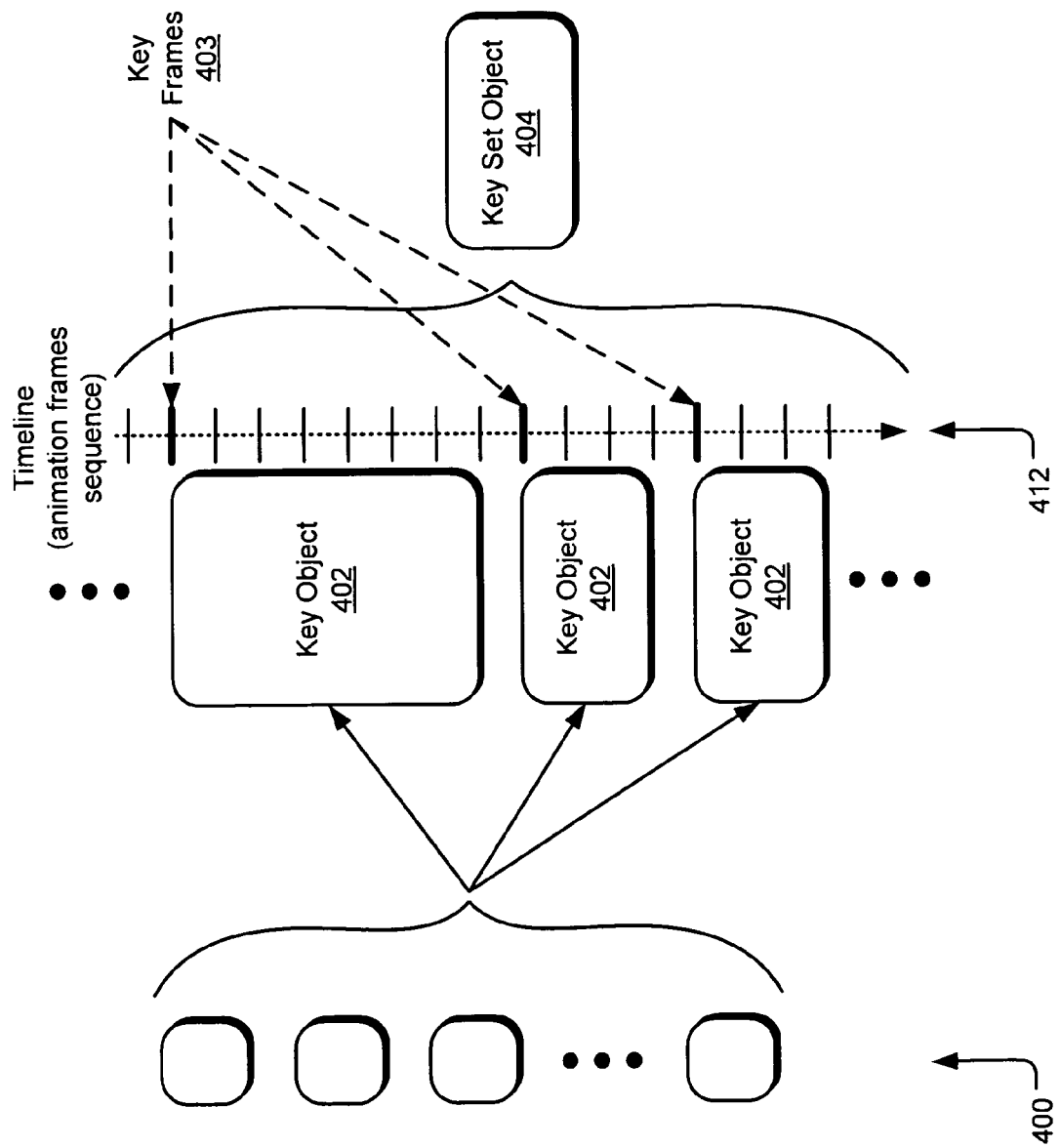
FIG. 4 illustrates example correspondence among design objects, key objects, and key set objects.

FIG. 4 illustrates example correspondence among design objects 400, key objects 402, and a key set object 404. Design objects 400 are placed on the stage and are eligible for animation, whether visible or hidden. For each key frame 403, namely an animation frame in which at least one property of an design object begins to change, a key object 402 is created and added to a key set object 404 that defines the graphical animation sequence. Note: If a design object does not experience animation of at least one of its properties in the current key frame, it need not be collected into the key object. As such, different combinations of design objects may be collected in different key objects. Likewise, if no design object experiences animation of at least one of property in the current animation frame, a key object need not be created in association with the current animation frame.

As shown, a portion of a graphical animation sequence is shown along a timeline 412 (each thin hash mark on the timeline represents an animation frame). Each key object 402 represent a key frame 403 defining changes in at least one property of at least one design object.

An example key class is described in the table below, although it should be understood that other class structures may be used to implement a key class.

TABLE 1

| Example key class | |
|---|---|
| | Description |
| Properties | |
| float DurationSecs | The duration of the animations managed by the key object. |
| float DelayStartSecs | A delay enforced at the beginning of the key frame time, before the "KeyStarted" event is triggered and the animation begins. |
| float DelayEndSecs | A delay enforced at the end of the animations sequence, before the animation triggers its "KeyCompleted" event. |
| int RepeatCount | The number of times the key object's animations should be repeated. |
| bool Enabled | If set to "false", the animation will not be played. |
| EaseType EaseIn | A ramp up or down at the beginning of the interpolation between a startVal and the midpoint value. |
| EaseType EaseOut | A ramp up or down at the end of the interpolation between a midpoint value and an endVal. |
| float EaseFactor | The slope of the ramp up or ramp down. |
| List<KeyProp> KeyProps | The list of properties being animated by this key object. |
| List<object> Objects | A list of design objects whose properties are being animated by this key object. |
| Events | |
| event KeyStarted | Indicates that the animation associated with the key object has started. |
| event KeyCompleted | Indicates that the animation associated with the key object has completed. |
| Methods | |
| Key(float durationSecs, object obj) | A standard constructer for a key object, where durationSecs represents the duration of the animation associated with the key object and obj represents a first design object to be managed by the key object. |
| void AddObject(object obj) | Add an design object to the key object |
| void Start( ) | Starts the animation associated with the key object. |
| void Restart( ) | Restarts the animation associated with the key object. |
| void Stop( ) | Stops the animation associated with the key object. |
| void SetProp(string propName, int startVal, int endVal) | Sets a property matching the string propName to transition between an integer startVal and an integer endVal |
| void SetProp(string propName, int endVal) | Sets a property matching the string propName to transition to an integer endVal |
| void SetProp(string propName, float startVal, float endVal) | Sets a property matching the string propName to transition from its current value to the specified integer endVal. |
| . . . | Other SetProp methods supporting other property types, including Colors, Quaternions, Points, Sizes, Vectors, and other types may be provided. |

An example usage of a key object from within C# source code is shown below:

Key key=new Key(1.2f, text3d1);
Key.SetProp("Scale", 0, 0.9f);
Key.SetProp("RotationX", 0, 3*360);
Key.Start( );

The first line creates a new key object, giving a duration of 1.2 seconds and an object to be animated called "text3d1" that is to be managed by the key object. The second line selects a property to be animated on the associated object (i.e., the text3d1 object) using a property named "Scale". The second line also sets a property change on Scale from zero to 0.9 during the duration of the key frame. The third line selects a "RotationX" property of the text3d1 object and changes the property value from 0 to "3*360 (i.e., 3 full rotations) during the duration of the key frame.

The fourth line starts the animation playback. The key object computes the start time and end time of the key frame—the current time is stored as the start time and the current time plus 1.2 seconds is stored as the end time. The key object also determines the frame rate of the text3d1 object. If the design object supports an animation interface (e.g., called IMinComponent in one implementation), the interface supports an event called "FrameMove", which gets triggered whenever it is time for the object to animate (e.g., move, once per animation frame, relative to the camera framework the object "exists" within). The key object hooks the FrameMove event so that each time the text3d1 object is supposed to change state (e.g., change a property value), the key object will be called and given a chance to update the properties being animated to correctly interpolated values. If the design object does not support an animation interface, the key object may use its own default animation frame rate to control when the properties of the design object are updated (e.g., the key object is called each time an animation frame is defined within a move frame module of a rendering module).

In one implementation, the key object uses runtime reflection to create a property setter object for each property being animated during the key frame. As such, a property setter object would be created for each of the Scale and RotationX properties. When the key object is triggered to change one or more properties of a design object, the key object iterates through each property setter. Each property setter calculates the correct updated property value (e.g., using interpolation, whether eased in, eased out, or linear) and applies the updated property value to the design object through the property setter.

The interpolation of a property value during a key frame is managed by the key object. The calculation of the updated property value at any point is time is done by interpolating between the starting and ending values of that property using the current time, the start time and the end time. In one implementation, the interpolation calculates the percentage of time elapsed (relative to the timer interval defined between the start time and end time), clipping the percentage between 0 and 100, transforming the percentage by an ease function, and then applying the new percentage to the delta between the start value and end value, and adding that value to the start value. The ease factor (e.g., hold, linear, fast, medium, slow) accelerates or decelerates the transition from the start value to the end value during the key frame.

The animation design application generates animation key frame data based on the definition of each key object and key set object. The animation key frame data includes the results of the designer's definition of the animation, including key frame settings and property value changes. A rendering module (see FIG. 5) performs the actual interpolations for playing the animation or generating multimedia data.

The key objects in a graphical animation sequence are collected in a key set object, which is created through the timeline interface. The first time a property of any design object is changed in a key frame, a key object for the key frame is created and the changed design object is added to the key object. In one implementation, the property change is detected by hooking the "property changed" event provided by the runtime reflection code. When this service is not available, the programmer can provide code to trigger a similar event when the GUI-related code changes a property value. When the event is triggered, a delegate (i.e., an object callback method) is created that is called when the PropertyChanged event of the design object is triggered. As discussed, design objects are added to the key object, along with their "before" and "after" property values. Furthermore, runtime reflection is used to create a property descriptor object, which assists with setting the property of each design object to a new value.

To create a property setter object, the runtime reflection code looks up a specified property name in the metadata property table of the class associated with the specified object. If found to be a valid property, the reflection code builds a property setter object that points to the property on the object. When the "set" method is later called on the property setter object, the object executes code to set the property it is pointing to using the specified new value. This code is equivalent to what the compiler would have generated for a direct assignment to the property.

The design object is added to the key object and the key object is and added to a key set object, which manages potentially multiple key objects in a graphical animation sequence of animation frames.

An example key set class is described in the table below, although it should be understood that other class structures may be used to implement a key set class.

TABLE 2

Example key set class

| | Description |
| --- | --- |
| Properties | |
| int keyNum | An index to the current key object. |
| bool stopping | A flag that indicates that the animation is in the process of stopping (e.g., by a Stop( ) method of a key object). |
| Key[ ] keys | A set of key objects contained in the key set object. |
| bool loop | A flag indicated whether the key frame sequence should re-start after the last key object. |
| Key currentKey | A reference to the current key object. |
| Methods | |
| KeySet(params Key[ ] keys) | A standard constructer for a key set object, where one or more key objects are specified and included in the object's set of keys. |
| void Start( ) | Starts the animation associated with first key frames of the key set object. |
| bool Loop | Toggles whether to loop. |
| Void StartNextKey(int keyNum) | Starts the animation associated with a specified key frame of the key set object. |
| void Stop( ) | Stops the animation associated with the key set object. |
| Events | |
| void key_KeyCompleted (object sender, EventArgs e) | The event occurs when animation for a contained key object has been completed. |

Figure 5:
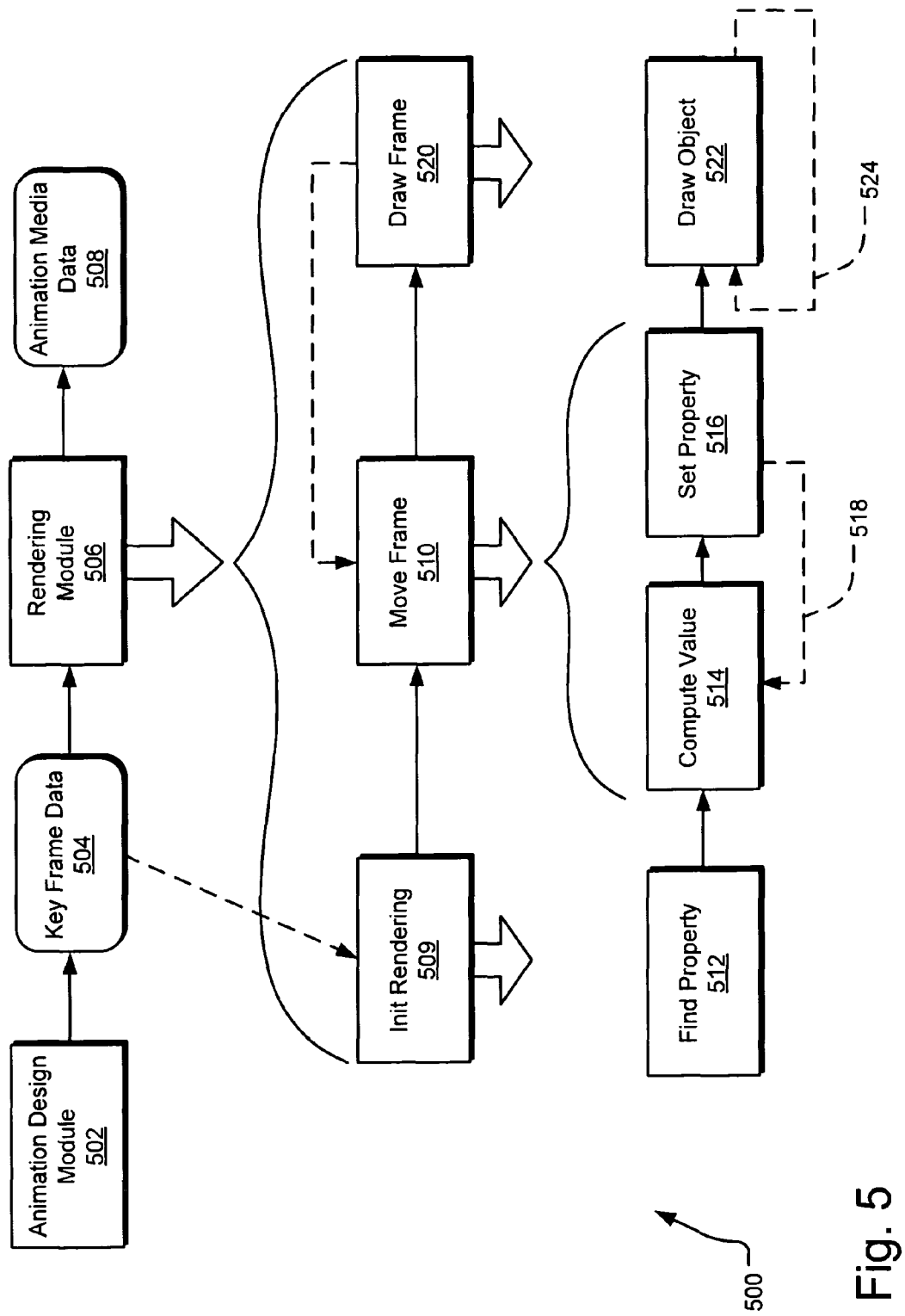
FIG. 5 illustrates example modules for rendering a graphical animation sequence using metadata.

FIG. 5 illustrates example modules 500 for rendering a graphical animation sequence using metadata. An animation design module 502 generates key frame data 504. A rendering module 506 inputs the key frame data 504 and renders the objects in each animation frame in accordance with each object's current properties. The rendering can be directed to a display (e.g., the stage window) or to another output (e.g., a multimedia file), such as animation multimedia data 508.

The rendering module 506 initially calls an init rendering module 509 to build the key and key set objects from the key frame data 504. The constructor of each key object calls a find property module 512, which looks up properties in the class metadata and builds the appropriate property getter objects (e.g., one for each property/object combination specified for the key object). In one implementation, the find property module 512 uses metadata-based techniques (e.g., runtime reflection) to find the specified properties, although, as previously discussed, a programmer can provide other means of finding specified properties and hooking events. Accordingly, the find property module 512 hooks the design object's "frame moved" event so that the key object can update the property value with the frame rate of the design object. At the end of the init rendering module's execution, a "start" method of a key set object is called to initiate the moving and drawing of various design objects.

In this subsequent phase of operation, the rendering module 506 calls the move frame module 510 and the draw frame module 520 in a looping fashion. The move frame module 510 loops over all design objects in the scene and calls each design object's MoveFrame( ) method, which causes the design object to issue its FrameMoved event. When the key object's delegate code is called in response to the FrameMoved event, it computes the property value (see compute value module 514), and sets the property value (see set property module 516). In one implementation, the set property module 516 use metadata-based techniques (e.g., runtime reflection) to find and set the specified property values, and the compute value module 514 can interpolate to find the update property value, although other computations may also be used. The move frame module 510 loops through objects in the scene (see arrow 518). Even objects not involved in the key object may be called in case they need to execute other custom actions in response to the "MoveFrame( )" call.

A draw frame module 520 then calls a draw object module 522 of each design object in the scene to render the design object. The looping arrow 524 represents an example for-each loop through each design object to provide an updated rendering of each object.

Figure 6:
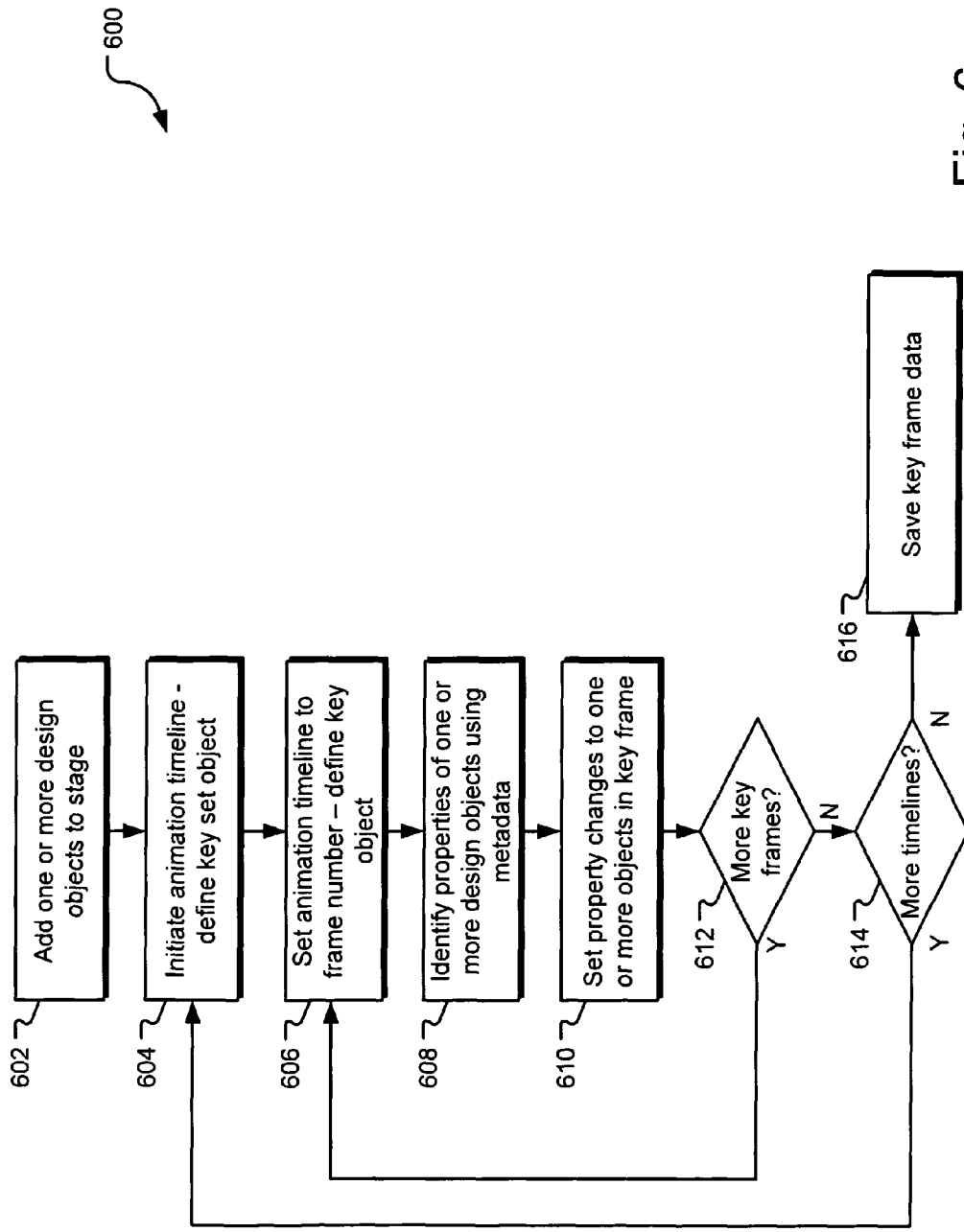
FIG. 6 illustrates example operations for generating key frame data associated with a graphical animation design application.

FIG. 6 illustrates example operations 600 for generating key frame data associated with a graphical animation design application. A staging operation 602 adds one or more design objects to a stage. In one implementation, the staging operation 602 handles a user's selecting of a design object from a toolbox, dragging the design object to the stage, and dropping the design object into the stage. Other user interface operations (e.g., cut-n-paste, context menus, etc.) may also be employed.

A timeline operation 604 initiates an animation timeline and defines a key set object. In one implementation, an animation timeline window is opened to define a new animation timeline, thereby allowing a user to define multiple key frames for the graphical animation sequence. A key frame operation 606 receives an indication of a key frame number. At this point, a key object may be defined for the indicated key frame, although in an alternative implementation, definition of a key object may wait until a property value change has actually been specified by the user.

A property identification operation 608 uses metadata associated with the design objects to identify the properties of the staged design objects available to the user. For example, the property identification operation 608 may use runtime reflection to identify such properties. A setting operation 610 sets property changes, such as new values or a range of values, to one or more properties of the staged design objects. A decision operation 612 determines whether another key frame is selected, in which case processing returns to key frame operation 606. Otherwise, processing continues to a decision operation 614, which determines whether another timeline is to be created, in which case processing returns to the timeline operation 604. Otherwise processing continues to a saving operation 616, which saves the key frame data (including key frame object definitions and key set object definitions) to persistent storage.

Figure 7:
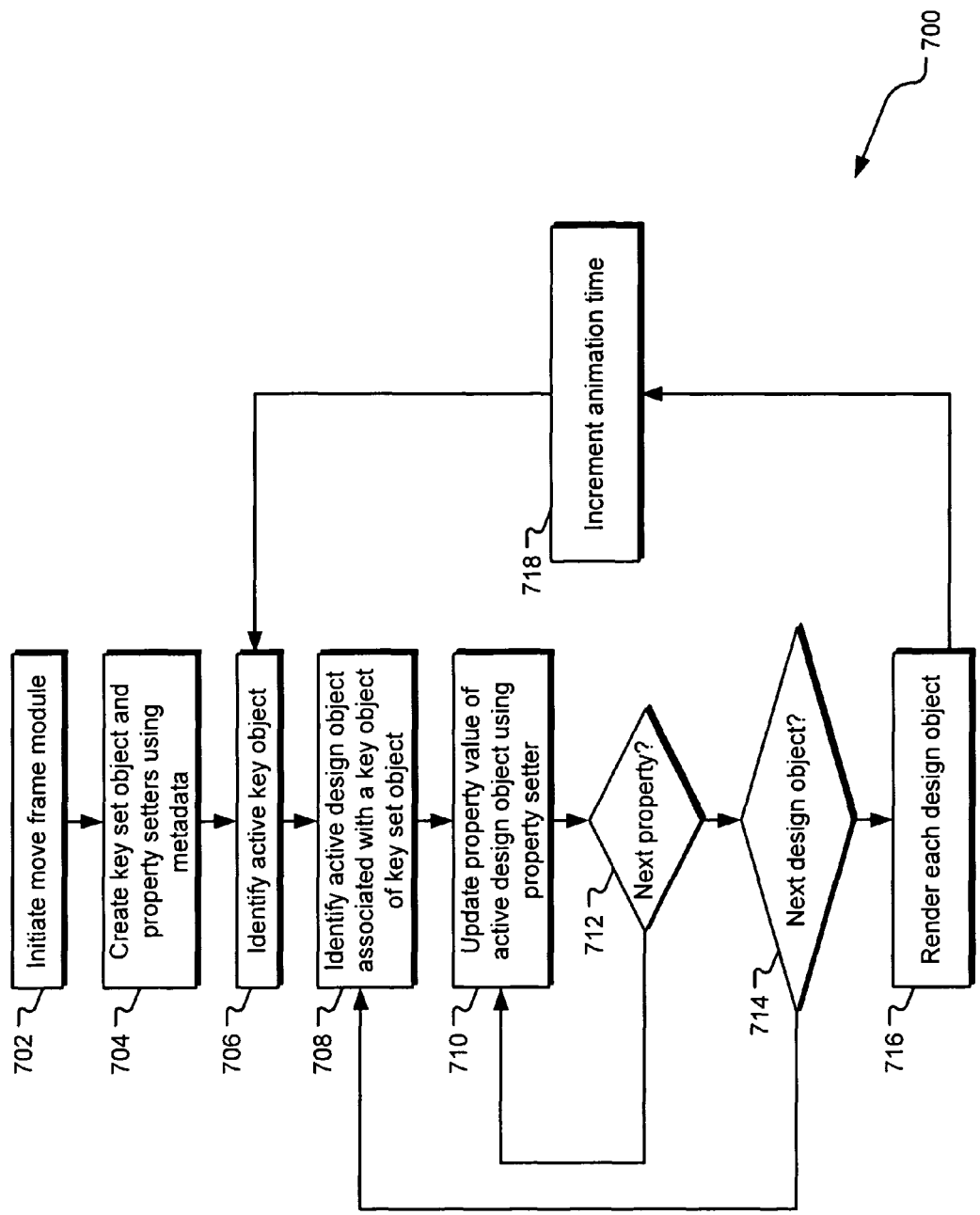
FIG. 7 illustrates more detailed example operations for rendering a graphical animation sequence using metadata.

FIG. 7 illustrates more detailed example operations 700 for rendering a graphical animation sequence using metadata. In one implementation, an initiation operation 702 initiates a move frame module on a specific defined key set object. A key set operation 704 creates the key set object along with all of the contained key objects. The design objects and properties being animated are stored directly in the key object. A key operation 706 identifies all active key objects associated with the current frame number (or time value). An identification operation 708 uses metadata to identify an active design object and the active properties thereof within the key frame associated with the key object. An active design object represents a design object having properties that change during the key frame. In one implementation, the identification employs runtime reflection to look up the objects and properties in the metadata. An updating operation 710 computes an updated property value of the current property of the current design object and sets the current property to the updated property value using metadata of the animation current object.

A decision operation 712 determines whether another property needs to be updated on the current design object, in which case processing returns to the updating operation 710. Otherwise, processing continues to a decision operation 714, which determines whether another design object needs to be updated, in which case processing returns to the identification operation 708. Otherwise, processing proceeds to a rendering operation 716, which renders each design object in the current key object in accordance with the design object's updated properties. An updating operation 718 increments the animation time and loops back to the key object operation 706 to continue with the next key frame of the graphical animation sequence.

It should be understood, however, that in an alternative implementation, repeated look ups may be avoided. In such an implementation, for example, when each key object is created within the key set object, a "property setter" object is built based on the metadata so that subsequent multiple property changes can be executed directly without further lookups. As such, the process may iterate through a list of property/object pairs, using the property setter to update the property values, thereby avoiding additional lookups.

The example hardware and operating environment of FIG. 8 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an animation design module, a rendering module, a move frame, a draw frame module, a find property module, a compute value module, a set property module, a draw object module, and other modules may be embodied by instructions stored in memory 22 and/or storage devices 29 or 31 and processed by the processing unit 21. Key frame data, multimedia data, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method of animating design objects in a graphical animation sequence, the method comprising:

presenting design objects selected and positioned by a user in a user interface displayed by a computing device;

creating a key set object defining the graphical animation sequence in response to initiating a timeline interface for defining behavior of the design objects in individual frames of the graphical animation sequence;

identifying properties of the design objects available for editing by the user using metadata associated with the design objects;

displaying a user interface for editing a key frame of the graphical animation sequence;

changing design objects in response to editing by the user of one or more identified properties of design objects to be animated in the key frame of the graphical animation sequence;

defining a key object corresponding to the key frame;

collecting the design objects in the key object corresponding to the key frame, the key objet referencing each changed design object and property change attributable to editing by the user of the one or more identified properties of the design objects to be animated in the key frame of the graphical animation sequence;

adding the key object corresponding to the key frame to the key set object defining the graphical animation sequence;

recording the graphical animation sequence in animation key frame data based on the key set object and each key object of the key set object; and animating the design objects in the key frame by:
    initially rendering the design objects in the key frame in accordance with current properties of the design objects from the animation key frame data,
    building the key set object and the key object corresponding to the key frame from the animation key frame data,
    identifying active design objects having current properties that change during the key frame and building property setting objects for the current properties of the active design objects that change during the key frame using metadata associated with the key object,
    iterating through the property setting objects to compute updated property values of the current properties of the active design objects and set the current properties of the active design objects to the updated property values using metadata associated with the active design objects, and
    providing an updated rendering of the design objects in the key frame in accordance with the updated property values of the current properties of the design objects.

2. The method of claim 1 wherein the key set object defining the graphical animation sequence includes multiple key objects corresponding to multiple key frames of the graphical animation sequence.

3. The method of claim 2 wherein the multiple key objects of the key set object defining the graphical animation sequence include different design objects.

4. The method of claim 1 wherein the key object references a property change to a hidden property of a design object to be animated in the key frame of the graphical animation sequence.

5. The method of claim 1 wherein the key frame has a duration greater than one animation frame.

6. The method of claim 1 wherein a current property of an active design object is characterized by a start value and an end value associated with a duration of the key frame.

7. The method of claim 6 further comprising interpolating between the start value and the end value to compute an updated property value of the current property of the active design object.

8. The method of claim 1 further comprising employing runtime reflection to identify the active design objects having current properties that change during the key frame.

9. The method of claim 1 wherein a property change attributable to editing by the user comprises a start value and an end value associated with a duration of the key frame and stored in the key object.

10. A computer-readable storage medium storing computer-executable instructions that, when executed, cause a computing device to perform a method of animating design objects in a graphical animation sequence, the method comprising:

presenting design objects selected and positioned by a user in a user interface displayed by the computing device;

creating a key set object defining the graphical animation sequence in response to initiating a timeline interface for defining behavior of the design objects in individual frames of the graphical animation sequence;

identifying properties of the design objects available for editing by the user using metadata associated with the design objects;

displaying a user interface for editing a key frame of the graphical animation sequence;

changing design objects in response to editing by the user of one or more identified properties of design objects to be animated in the key frame of the graphical animation sequence;

defining a key object corresponding to the key frame;

collecting the design objects in the key object corresponding to the key frame, the key objet referencing each changed design object and property change attributable to editing by the user of the one or more identified properties of the design objects to be animated in the key frame of the graphical animation sequence;

adding the key object corresponding to the key frame to the key set object defining the graphical animation sequence;

recording the graphical animation sequence in animation key frame data based on the key set object and each key object of the key set object; and animating the design objects in the key frame by:
    initially rendering the design objects in the key frame in accordance with current properties of the design objects from the animation key frame data,
    building the key set object and the key object corresponding to the key frame from the animation key frame data,
    identifying active design objects having current properties that change during the key frame and building property setting objects for the current properties of the active design objects that change during the key frame using metadata associated with the key object,
    iterating through the property setting objects to compute updated property values of the current properties of the active design objects and set the current properties of the active design objects to the updated property values using metadata associated with the active design objects, and
    providing an updated rendering of the design objects in the key frame in accordance with the updated property values of the current properties of the design objects.

11. The computer-readable storage medium of claim 10 wherein the key set object defining the graphical animation sequence includes multiple key objects corresponding to multiple key frames of the graphical animation sequence.

12. The computer-readable storage medium of claim 11 wherein the multiple key objects of the key set object defining the graphical animation sequence include different design objects.

13. The computer-readable storage medium of claim 10 wherein the key object references a property change to a hidden property of a design object to be animated in the key frame of the graphical animation sequence.

14. The computer-readable storage medium of claim 10 wherein the key frame has a duration greater than one animation frame.

15. The computer-readable storage medium of claim 10 wherein a current property of an active design object is characterized by a start value and an end value associated with a duration of the key frame.

16. The computer-readable storage medium of claim 15 further comprising stored computer-executable instructions for interpolating between the start value and the end value to compute an updated property value of the current property of the active design object.

17. The computer-readable storage medium of claim 10 further comprising stored computer-executable instructions for employing runtime reflection to identify the active design objects having current properties that change during the key frame.

18. The computer-readable storage medium of claim 10 wherein a property change attributable to editing by the user comprises a start value and an end value associated with a duration of the key frame and stored in the key object.

19. A computing device comprising memory storing computer-executable instructions and a processing unit for executing the computer-executable instructions stored in the memory to perform a method of animating design objects in a graphical animation sequence, the method comprising:
 presenting design objects selected and positioned by a user in a user interface displayed by the computing device;
 creating a key set object defining the graphical animation sequence in response to initiating a timeline interface for defining behavior of the design objects in individual frames of the graphical animation sequence;
 identifying properties of the design objects available for editing by the user using metadata associated with the design objects;
 displaying a user interface for editing a key frame of the graphical animation sequence;
 changing design objects in response to editing by the user of one or more identified properties of design objects to be animated in the key frame of the graphical animation sequence;
 defining a key object corresponding to the key frame;
 collecting the design objects in the key object corresponding to the key frame, the key objet referencing each changed design object and property change attributable to editing by the user of the one or more identified properties of the design objects to be animated in the key frame of the graphical animation sequence;
 adding the key object corresponding to the key frame to the key set object defining the graphical animation sequence;
 recording the graphical animation sequence in animation key frame data based on the key set object and each key object of the key set object; and
 animating the design objects in the key frame by:
  initially rendering the design objects in the key frame in accordance with current properties of the design objects from the animation key frame data,
  building the key set object and the key object corresponding to the key frame from the animation key frame data,
  identifying active design objects having current properties that change during the key frame and building property setting objects for the current properties of the active design objects that change during the key frame using metadata associated with the key object,
  iterating through the property setting objects to compute updated property values of the current properties of the active design objects and set the current properties of the active design objects to the updated property values using metadata associated with the active design objects, and
  providing an updated rendering of the design objects in the key frame in accordance with the updated property values of the current properties of the design objects.

20. The computing device of claim 19 wherein the key set object defining the graphical animation sequence includes multiple key objects corresponding to multiple key frames of the graphical animation sequence.

* * * * *